United States Patent

[11] 3,547,372

[72] Inventor Don C. Barnett
Columbus, Ind.
[21] Appl. No. 758,060
[22] Filed Sept. 6, 1968
[45] Patented Dec. 15, 1970
[73] Assignee Arvin Industries, Inc.
Columbus, Ind.
a corporation of Indiana

[54] CAPSTAN FOR TAPE TRANSPORT
4 Claims, 6 Drawing Figs.

[52] U.S. Cl. .......... 242/192; 226/186, 226/190
[51] Int. Cl. .......... G03b 1/04; G11b 15/32
[50] Field of Search .......... 242/186, 204; 226/186, 190, 193

[56] References Cited
UNITED STATES PATENTS
2,657,871 11/1953 Pettus .......... 242/192
2,673,041 3/1954 Hittle .......... 242/192
FOREIGN PATENTS
702,345 2/1941 Germany .......... 242/192

*Primary Examiner*—Leonard D. Christian
*Attorney*—Marechal, Biebel, French & Bugg

ABSTRACT: A capstan for a tape transporting system has a rim with circumferential recess deeper at its center than its edges. A resilient tire member is mounted in the recess, and has an outer cylindrical face to engage the tape and guide it past a recording or pickup head.

PATENTED DEC 15 1970

3,547,372

*INVENTOR*

DON C. BARNETT

*BY*

Marechal, Biebel, French & Bugg

*ATTORNEYS*

CAPSTAN FOR TAPE TRANSPORT

CROSS-REFERENCES TO RELATED APPLICATIONS

The present invention is generally related to the inventions disclosed and claimed in U.S. Pat. applications Ser. No. 705,478, now U.S. Pat. No. 3,489,369, Serial No. 705,479 and Serial No. 705,405, now U.S. Pat. No. 3,468,497 all filed on Feb. 14, 1968, and assigned to the same assignee as this application.

BACKGROUND OF THE INVENTION

Capstans used in tape transport systems, particularly transports for magnetic tape recording units, are often provided with a resilient surface. This surface enhances the frictional engagement of the capstan and tape, thus promoting accurate control over tape velocity. In some forms of units, the resilient surface also positions the tape for the recording and/or pickup head, and, particularly in high speed reversible units, the capstan also drives the takeup.

It has been observed that an ordinary bandlike resilient tire of uniform cross section tends to deform under pressure and the edges of the tire bulge outward causing the edges of the tape to curl outward, and thus distorting the desired flat tape profile which is particularly important in the region where it engages the takeup roll.

SUMMARY OF THE INVENTION

By employing a capstan tire of controlled cross section, thicker at its center than at its edges, preferably of a rather wide V-shape in section, it is possible to compensate for the above-mentioned tire distortion. Such a tire provides equal force across the contact surface of the tire with the takeup roll, thus when pressure is applied across the tire, the tendency to distort or "spill-over" at the edges is minimized to the point that an essentially true cylindrical face is presented. This holds the tape in a flat or straight profile, promotes a flat, tightly wound takeup roll, and also provides a flat tape surface allowing the head to track in a straight line across the entire width of the tape.

Accordingly, the primary object of this invention is to provide a novel capstan having a tire which is thicker at its center than at its edges, for example having a rather wide V-shape in cross section; and to provide a novel tape transporting system incorporating such a capstan.

Other objects and advantages of the invention will be apparent from the following description, the accompanying drawing and the appended claims.

DESCRIPTION OF THE PREFERRED EMBODIMENT

Figure 1:
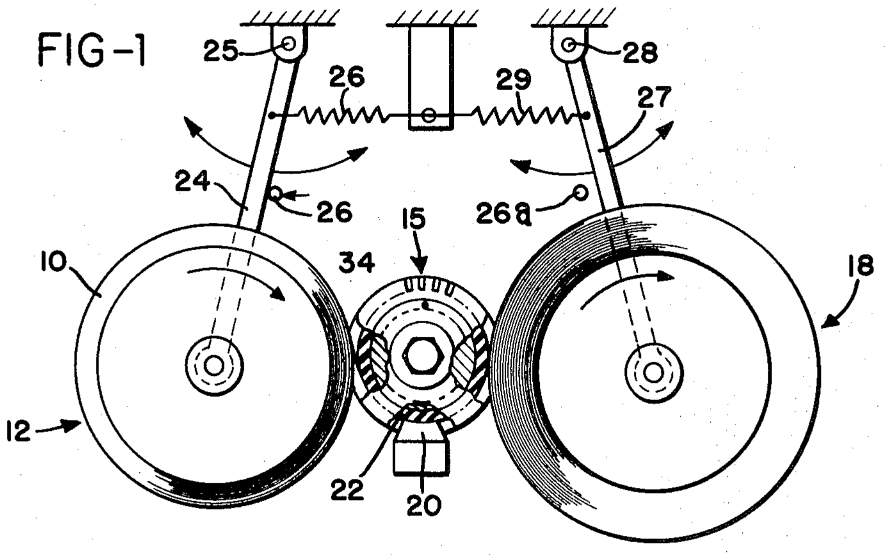
FIG. 1 is a diagrammatic illustration of one form of tape handling system incorporating the novel capstan of the present invention.

Referring to the drawing, which illustrates a preferred embodiment of the invention, FIG. 1 shows a typical tape transporting system to which the present invention is applicable. Details of such a system are described in the copending application of Kingston E. Ganske et al., Ser. No. 705,478, filed on Feb. 14, 1968, entitled TAPE TRANSPORT SYSTEM, and assigned to the same assignee as this application. For purposes of illustration, the details of the system have been omitted from FIG. 1 and only the major elements are shown.

The tape 10 is received from a supply roll 12, passes directly to and around the drive capstan 15, and onto the takeup roll 18. In passing over the capstan the tape is carried across a magnetic recording/playback head 20 incorporating one or more transducers. The head is movable to different positions transversely with respect to the direction of the tape movement, for example by the arrangement disclosed in said copending application Ser. No. 705,479, filed Feb. 14, 1968. The capstan 15 is provided with a resilient tire member 22, details of which are described hereafter. A swingable arm 24, pivotally mounted to the base at 25, carries the roll 12 and the outer convolutions of the roll are urged toward the capstan 15 by a spring 26.

In the aforementioned system, means including rollers 26 and 26*a* are provided for holding the supply roll spaced somewhat from the capstan, however details of that means are omitted from FIG. 1 here, since they form no part of the present invention. A swingable arm 27, pivoted to the base at 28, mounts the takeup roll 18 which is urged toward and into contact with the capstan by the spring 29. The capstan is driven by a synchronous motor (not shown) which may be reversible in order to run the tape in either direction past the magnetic recording/playback head 20, in which case the rolls 12 and 18 function interchangeably as the supply or takeup depending upon the direction of operation, and the control rollers 26 and 26*a* act accordingly to space the supply from the capstan and allow the takeup to engage and be driven by the capstan.

Figures 2, 3, 4, 5, 6:
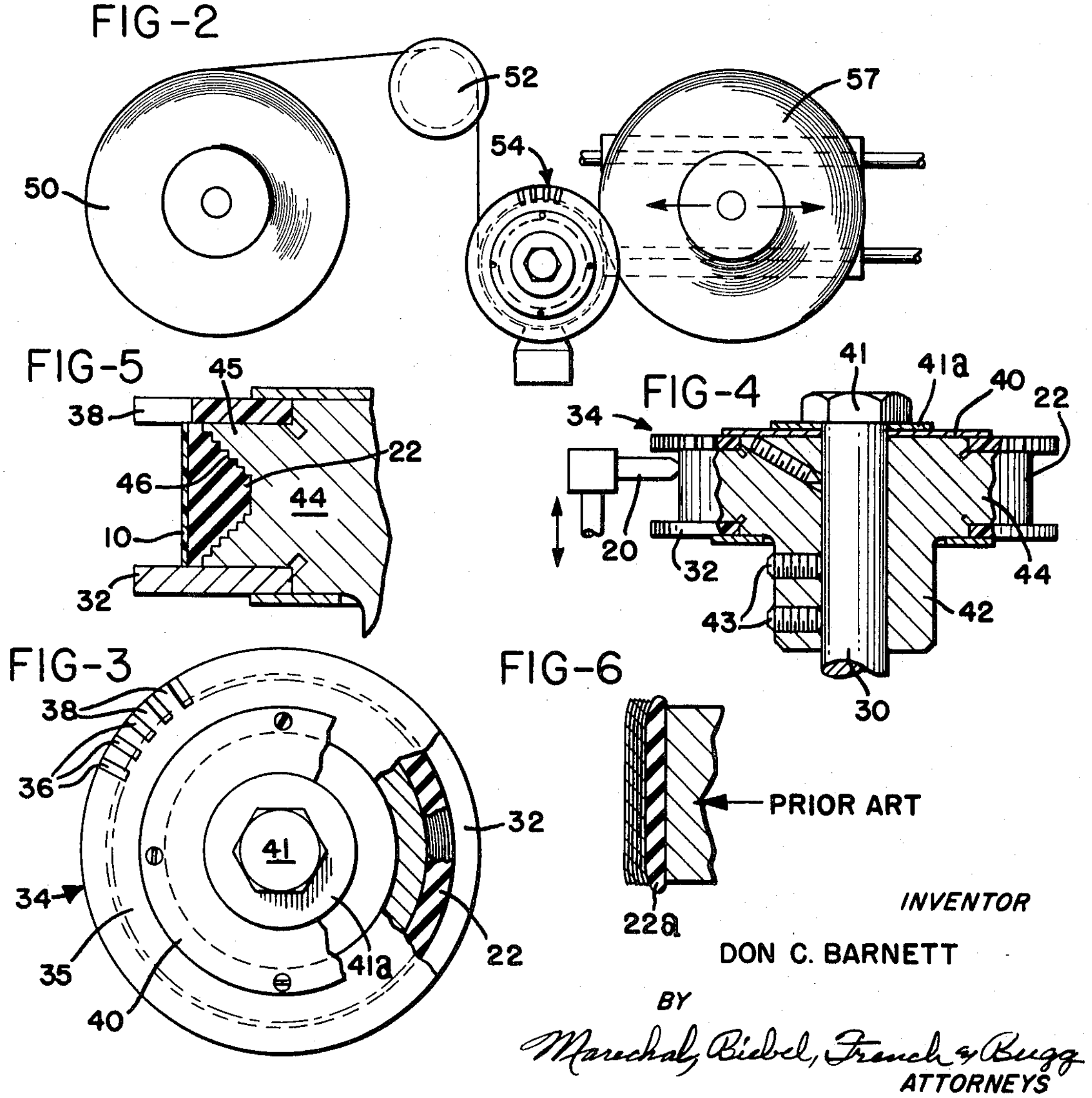
FIG. 2 is a diagrammatic illustration of another form of tape transporting system incorporating the novel capstan.
FIG. 3 is a top view of the capstan.
FIG. 4 is an enlarged view, partly in section, showing details of the capstan and the tire configuration.
FIG. 5 is an enlarged detail, in cross section, showing a preferred tire member for the novel capstan.
FIG. 6 is an enlarged segmental view showing a condition prevailing in the prior art.

Referring to FIGS. 3 and 4, the capstan is mounted on shaft 30 through which its rotary drive is transmitted from the motor, and the capstan includes at its lower end a rigid guide flange 32 which forms a reference to locate the tape precisely, such that the head 20 follows exactly a track on the tape. A flexible upper flange 34 is mounted to the upper or other end of the capstan, and comprises a disclike member 35 having slots 36 formed in its outer edge, preferably extending radially, and defining between the slots a plurality of independently flexible fingers 38.

The root portion of these fingers preferably is located radially inward of the surface of the cylindrical face of the tire member 22, thus the entire extent of the flange 34 beyond this surface portion is comprised of the independent flexible fingers. The flexible flange member 34 is formed of a suitable synthetic plastic material such as Delrin. The flange can readily be fastened to the capstan by a retaining plate 40. A nut 41 is also tightened against a washer 41*a* over the top of the retaining plate. Details of this flange and its function are disclosed in said copending application Ser. No. 705,405, filed Feb. 14, 1968.

It has been found particularly in tape handling systems such as shown in FIG. 1, that it is desirable to locate the underside of the fingers 38 with respect to the upper surface of the rigid flange 32 by a distance slightly less than the width of the tape. For example, operating with tape ½-inch width, suitable results have been obtained by having this spacing in the order of 0.499 inch. As the tape enters the capstan the fingers exert a springlike force against one edge of the tape urging it into contact with the rigid flange 32, thereby maintaining an exact reference. This is particularly important where it is necessary to have precise guidance of the tape past the magnetic head 20.

The head 20 is moved transversely with respect to the direction of the tape, so as to follow different tracks, and precise control of this movement, and of the cross section profile of the tape passing the head, is important to achieve accurate reading and/or recording. Pressure of the tire against the takeup roll produces a force against the resilient tire member on the capstan. This in turn appears to cause a flow of the resilient material of the tire member 22.

FIG. 6 shows a typical situation encountered in the prior art, where the tire member 22*a* is formed as a cylindrical band of rubber or the like, having a uniform thickness top to bottom in its unstressed condition. In operation the pressure of the tape against the tire, and also the pressure against the takeup in the arrangement shown in FIG. 1, causes the incompressible material to flow toward its edges and bulge. This leads to a curl in the edges of the tape, and as a result the tape profile is not flat where tightly wound on the takeup hub, rather the edges curl outward as shown. This creates a tendency toward bumps in the peripheral edges of the tape roll, resulting in uneven, bouncing contact between the capstan and the roll.

In accordance with the invention, a novel capstan is provided with a hub 42 (FIG. 4) having set screws 43 which can engage shaft 30. The wheel portion 44, preferably integral with the hub, has its outer rim section 45 formed with a recess 46 (FIG. 5) which is deeper at its center than at its opposite edges. The tire member 22 is of complementary shape to the recess, hence the tire member is thicker at its midsection than at its edges, and has a cylindrical outer face, or tape engaging surface, which is perpendicular to the axis of rotation defined by the shaft and hub. Preferably the tire is cast or molded into the recess 46, and the outer surface of the tire is machined to a true right cylinder with respect to the axis of rotation.

The recess 46 can conveniently be formed with a roughened or irregular surface, and the tire member 22 can then be molded in place, and its outer face machined accurately to the desired cylindrical shape. Such irregularities are indicated in FIG. 5 by the stepped interface between the tire member and recess. In a preferred form the tire member 22 is generally V-shape in cross section.

In operation, the thinner cross section of the edges of the tire member appear to be resistant to deformation. This appears to equalize the incremental forces exerted against the tape across the tire. It has been found that the tape profile remains essentially straight.

Where the tape leaves the capstan and passes to the takeup roll 18, the fingers 78 assist in laying the tape precisely upon the outermost convolution of the takeup roll, and also accommodate local disturbances or misalignment without reflecting this as an opposite force to any other fingers or other part of the flange 34.

FIG. 2 illustrates another form of tape transport system in which the novel capstan is incorporated. The tape from a supply such as a reel 50 passes to and around a guiding roller over a capstan 54 to a takeup reel 57 which has its spindle mounted for movement toward and away from the capstan as the amount of tape wound thereon decreases or increases. In this system the capstan 54 is fitted with the same tire configuration, and with lower guiding flange and an upper slotted guiding flange, incorporating the independently flexible fingers as previously described.

While the form of apparatus herein describe constitutes a preferred embodiment of the invention, it is to be understood that the invention is not limited to this precise form of apparatus, and that changes may be made therein without departing from the scope of the invention.

I claim:

1. In a capstan adapted for frictional engagement with tape material to be transported from a supply to a takeup, the combination of:

a hub constructed to be connected to a rotary drive and defining the axis of rotation of the capstan;

a wheel portion on said hub including a rim section having a recess generally V-shape in cross section around its periphery which recess extends deeper into said rim section at the center than at the opposite edges of said recess; and a resilient tire member mounted in said recess and having an inner surface shaped to fit said recess and an outer cylindrical face extending perpendicular to the axis of rotation.

2. A capstan as defined in claims 1, including a first fixed tape guiding flange extending radially outward of one edge of said tire member; and a second tape guiding flange having a plurality of independently flexible fingers extending radially outward of the other edge of said tire member.

3. In a tape handling system including a supply of flexible tape and a takeup onto which the tape is wound, the improvement comprising:

a rotatable cylindrical capstan;

a first tape guiding flange extending radially from one end of said capstan for locating one edge of the tape passing over a section of the peripheral face of said capstan;

a second tape guiding flange means extending radially from the other end of said capstan and including a plurality of independently flexible fingers each engageable with the other edge of the tape;

a resilient tire member having a cylindrical face portion for contacting the tape, the connection between said fingers and the remainder of said second flange being radially inward of said face portion whereby only portions of said fingers contact the other edge of the tape while the tape is passing across said capstan; and said tire member being substantially thicker at its midsection than at its edges.

4. A tape handling system as defined in claim 3, including means mounting said takeup for relative movement with respect to said capstan and urging the outermost convolutions of tape on said takeup against said tire member.